G. J. MONEY.
FLARE.
APPLICATION FILED MAR. 26, 1917.

1,293,507.

Patented Feb. 4, 1919.

Inventor
George John Money
by
W. E. Evans
Attorney.

UNITED STATES PATENT OFFICE.

GEORGE JOHN MONEY, OF LONDON, ENGLAND.

FLARE.

1,293,507. Specification of Letters Patent. Patented Feb. 4, 1919.

Application filed March 26, 1917. Serial No. 157,566.

*To all whom it may concern:*

Be it known that I, GEORGE JOHN MONEY, a subject of the King of Great Britain, residing at 61 Fortess road, Kentish Town, London, N. W., England, have invented certain new and useful Improvements Relating to Flares, of which the following is a specification.

This invention relates to flares and has for its object to produce a flare in the use of volatile liquid hydrocarbons and to produce a flaring light or signal without the necessity of the use of any expensive apparatus.

According to the invention the volatile liquid is contained within an inclosing burner casing provided of such a substance that the volatile liquid may readily pass through for charging the casing and through which the vapor may pass on the ignition of the volatile liquid on the exterior of the casing and by which the volatile liquid within the casing may be heated and volatilized, so that a flaring light on the outside of the casing is maintained. The inclosing burner casing thus serves at once for charging the volatile liquid and as a burner by which the volatile liquid is heated and volatilized.

According to the invention a series of shallow, bowl or dish-shaped receptacles, advantageously formed of metal, are arranged one upon the other, with suitable absorbent packing within, such as carbonized fiber or cotton, and this series of shallow, bowl or dish-shaped receptacles with absorbent packing in the interval between the receptacles, and the receptacles integrally connected together, are placed within a casing of a substance having the qualities indicated, the casing being conveniently provided of a wire cage or of a perforated metal cage, within which a sheet of asbestos is secured as a lining. The sheet of asbestos is applied and secured in position within the burner casing, being perforated all over with small holes.

On such a casing with a series of receptacles within being placed in a container of petroleum, the petroleum passes into the casing and into the bowl or dish-shaped receptacles and is absorbed by the absorbent material between the receptacles, and on being withdrawn and drained a light may be applied on the exterior of the casing, a flaming light being thus produced. The flame imparts heat to the casing, thereby the petroleum within the receptacles is volatilized and a flaming light continuously maintained.

Such a flaming light is useful more especially outdoors and as a signal.

The invention is illustrated by way of example in the accompanying drawings, in which—

Figure 1:
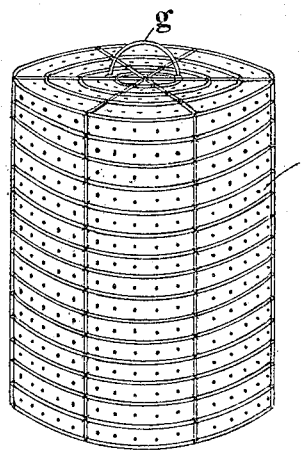
Figure 1 illustrates in perspective a casing provided according to the invention.
Figure 2:
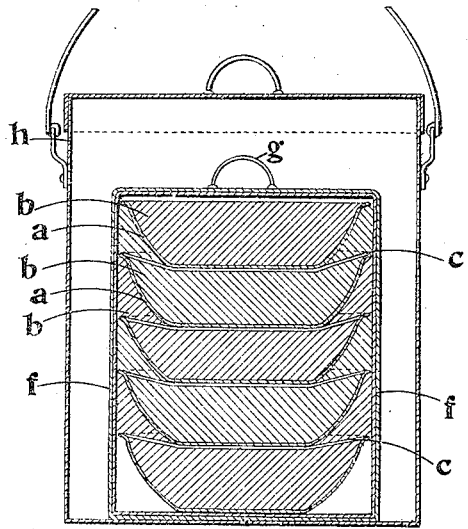
Fig. 2 is a sectional elevation showing the casing such as illustrated in Fig. 1, containing a series of receptacles for the volatile liquid, the casing being mounted within a container in which it is charged with volatile liquid.
Figure 3:
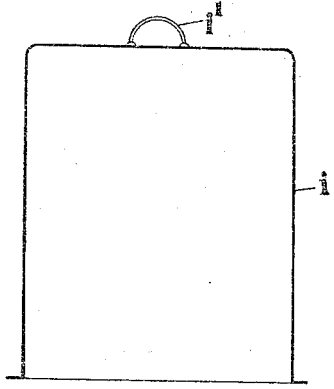
Fig. 3 illustrates an extinguisher capable of being applied over the casing (Fig. 1) for the purpose of extinguishing the light.
Figure 4:
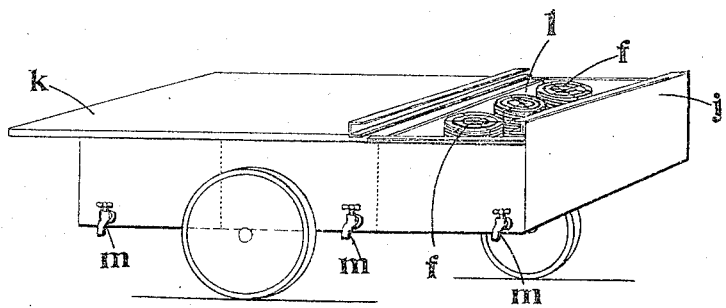
Fig. 4 illustrates a tank mounted on wheels within which a number of casings may be charged with the petroleum or other volatile liquid contained within the tank.

In carrying the invention into effect as illustrated in Figs. 1 and 2 of the accompanying drawings, I provide a series of bowl or dish-shaped receptacles $a$, which are mounted one upon the other and at a determined distance apart and between which packing $b$ is applied which may consist of carbonized fiber or cotton or any other absorbent packing that may be rendered fireproof by a known treatment. The receptacles $a$ have a number of wires $c$ transversely mounted across the receptacles by which they may be carried one upon the other with an interval between within which the packing $b$ may be applied, and the receptacles fit closely within the inclosing casing $f$. The inclosing casing $f$ may advantageously be formed as a wire cage of cylindrical shape closed at both ends, and in the upper end a handle $g$ may be provided by which the casing $f$ may be lifted out of the container and carried from place to place. By the employment of a number of shallow receptacles such as $a$ a considerable quantity of volatile liquid may be carried, and thus the draining away of the volatile liquid is minimized or avoided.

The casing $f$ is lined completely on the inside with sheets of asbestos, which on being moistened will readily conform to the shape of the receptacle without cracking, and by which a completely inclosed chamber is provided. Small holes are made in the asbestos sheets or lining when dried. These holes allow the escape of vapor.

The casing $f$ may, for example, be made 11-inches in height and 9-inches in diameter, and holes of $\frac{1}{32}$nd of an inch in diameter may be distributed at about half-an-inch apart in the cylindrical wall of the casing.

If desired, the top of the casing $f$ may be provided as a separable cover, but ordinarily this is not required, inasmuch as the casing after being used may be readily charged by immersion within the volatile liquid, the holes within the lining of the casing thus serving for the admission of the volatile liquid within the casing and for the outward passage of the vapor from within.

It will be understood that in the use of a volatile liquid such as kerosene or paraffin, the casing $f$ while still burning may be passed into a container such as $h$ for recharging, the flame being extinguished on immersion; or where required an extinguisher $i$, being of cylindrical form inclosed at its upper end where it is provided with a handle $i^1$ may be employed, the extinguisher $i$ being of a shape generally corresponding with the shape of the casing $f$ so that on the extinguisher $i$ being placed over the casing the flame is at once extinguished. Instead of the cylindrical container $h$ for recharging the casings, a tank $j$ may be provided adapted to carry a considerable number of the burner casings $f$. The tank $j$ may be provided with a sliding cover $k$. Such a tank may be provided in compartments by means of partitions $l$, and each compartment may be provided with a draincock $m$ so that the central compartment may, for example, serve to contain the volatile liquid for charging them while another compartment may serve to receive the ignited burner casings, which may be quickly extinguished by the sliding cover $k$ being moved over the tank to completely cover it, so that it may thus be used for the purposes of signaling.

It will be understood that the inclosing burner casing may be formed in any other manner than as indicated; it may, for example, be entirely formed of gauze or of a number of layers of gauze.

I claim:

1. A flare, comprising a plurality of shallow receptacles arranged one upon the other in series, with absorbent material between them, and an inclosing burner casing therefor, which is formed of a substance adapted to prevent the flame from passing into the casing and serving for the outward passage of vapor for ignition on the exterior thereof, substantially as described.

2. A flare, comprising a plurality of shallow receptacles arranged one upon the other in series, with absorbent material between them formed of carbonized fiber, and an inclosing burner casing therefor, which is formed of a substance adapted to prevent the flame from passing into the casing and serving for the outward passage of vapor for ignition on the exterior thereof, substantially as described.

3. A flare, comprising a receptacle for the volatile liquid and an inclosing burner casing, which is formed of a substance adapted to prevent the flame from passing into the casing and serving for the outward passage of vapor for ignition on the exterior thereof, and a container for volatile liquid within which the said burner casing may be immersed, substantially as described.

GEORGE JOHN MONEY.